United States Patent
Chevassus-More et al.

(12)
(10) Patent No.: US 6,203,343 B1
(45) Date of Patent: Mar. 20, 2001

(54) CABLING ARRANGEMENT INTENDED FOR MOTORIZED VEHICLE AND SIMILAR

(75) Inventors: Alain Chevassus-More, Touillon et Loutelet; Christian Pernot, Pontarlier, both of (FR)

(73) Assignee: Framatome Connectors International, Courbevoie (FR)

(*) Notice: Subject to any disclaimer, the term of this patent is extended or adjusted under 35 U.S.C. 154(b) by 0 days.

(21) Appl. No.: 09/417,723

(22) Filed: Oct. 14, 1999

(30) Foreign Application Priority Data

Oct. 15, 1998 (FR) .................................................. 98 12975

(51) Int. Cl.⁷ ........................................................ H01R 4/60
(52) U.S. Cl. .......................... 439/210; 439/213; 174/72 B
(58) Field of Search ..................................... 439/210, 213, 439/34; 174/72 B; 361/648, 775

(56) References Cited

U.S. PATENT DOCUMENTS

| | | | |
|---|---|---|---|
| 3,264,403 | * 8/1966 | Erdle | 174/72 B |
| 3,400,303 | * 9/1968 | Rowlands | 174/72 B |
| 3,476,871 | * 11/1969 | Erdle | 174/72 B |
| 4,831,278 | 5/1989 | Ueda et al. | 307/10.1 |
| 5,460,530 | 10/1995 | Toba et al. | 439/34 |
| 5,745,027 | 4/1998 | Malville | 340/310.01 |

FOREIGN PATENT DOCUMENTS

| | | |
|---|---|---|
| 19649972 A1 | 5/1998 | (DE). |
| 2758432 | 7/1998 | (DE). |
| 19814350 A1 | 10/1998 | (DE). |
| WO 98/35856 | 8/1998 | (WO). |

OTHER PUBLICATIONS

"New Materials and Techniques for Automotive Cabling", Feigenhauer, ATZ Automobiltechnische Zeitschrift 99, 1997, issue 3.

* cited by examiner

*Primary Examiner*—Paula Bradley
*Assistant Examiner*—Tho D. Ta
(74) *Attorney, Agent, or Firm*—Perman & Green, LLP (57) ABSTRACT

The present invention relates to a cabling arrangement for motorized vehicles and similar comprising a system for electrical power supply and a system of data transmission via a busbar (1) to which components signals are addressed separately using a multiplexing process. This arrangement has at least one busbar (1) with at least two power conductors (2, 3) for the supply of electrical power to components and at least two conductors (4) used by the busbar data transmission system (1). All the conductors (2,3,4) are in the form of metal strips and are separated one from another by insulating sheet material (5) and assembled in a laminated or "sandwich" structure, each component or a secondary busbar taking off control or power current from the busbar through their respective connectors.

19 Claims, 7 Drawing Sheets

CABLING ARRANGEMENT INTENDED FOR MOTORIZED VEHICLE AND SIMILAR

BACKGROUND OF THE INVENTION

The present invention relates to a cabling arrangement intended for motorised vehicles or similar as described in the introduction to claim 1. Such cabling arrangements, whose functioning is based on a system for transmitting data via a busbar, are known, as for example in the article "Neue Werkstoffe und Techniken für die Verkabelung im Automobil" [New materials and techniques for automotive cabling] by Reinhard Feigenhauer, published in the journal ATZ Automobiltechnische Zeitschrift 99 (1997), issue 3, pages 148 et seq.

The development of the cabling arrangement shown here derives from the need to make a substantial reduction in the number of individual cables in motorised vehicles, thereby reducing the weight of the cable bundle. It is estimated that when completely fitted out, a high-end car contains up to 80 servomotors and that the management of the monitoring and control functions of the motor and the various programs for vehicle stability and steering need an increasing number of sensors. The weight as such of a conventional cable bundle is therefore becoming a central problem and is holding back further technical development. For this reason, the idea was conceived of installing systems for the transmission of data via loop circuits, with each component possessing a multiplexed connection plug in order to collect from that component specific information or to send information along the loop. Such data transmission generally involves the use of currents of several tens of milliamps and a voltage in the region of 5 volts. Sensitivity to external interference and interference caused to the control signals carried in neighbouring cables are however a source of difficulty. In addition, the busbar systems described do not possess current supply lines for specific components as conventionally connected with lines carrying currents of 160 A at a voltage of 12V. The use of such a busbar already enables a considerable reduction to be made on the number of cables installed. The complete network is nevertheless complex and sensitive to electromagnetic interference.

BRIEF SUMMARY OF THE INVENTION

The present invention relates to a cabling arrangement for motorised vehicles or similar, enabling the cabling to be substantially simplified and its weight considerably reduced, with an accompanying significant reduction in sensitivity to electromagnetic interference.

This goal is attained using cabling in accordance with the claims. The preferred embodiments of the invention are described in the sub-claims.

The concept underlying the present invention involves the manufacture of power conductors and control conductors in the form of thin strips or sheets, arranged in a "sandwich" configuration and separated one from another by sheet material offering high insulation. This arrangement is advantageous compared with metal wires with an essentially round cross-section in that the busbar thus formed act as capacitors in a manner such that data transmission is protected from external interference.

Moreover, such busbar can be shaped with ease and lend themselves to easy fitting, which may also be automated. They offer, compared with the bundled cable systems described above, a weight saving which may attain one-third according to the model. Its rigid construction reduces the risk of confusing different connections and simplifies assembly.

The large conductor cross-section and the materials used combine to obviate any notable voltage fall along the busbar.

In addition, prior to assembly, the busbar may be ready-shaped to take account of the location at which they are to be fitted, following the contours of the chassis or the metalwork of the vehicle, with the result that an arrangement occupying very little space is possible.

BRIEF DESCRIPTION OF THE DRAWINGS

The invention is described in detail below using descriptions of examples of embodiments and with reference to the drawings, in which:

FIG. 3b is a partial perspective view of one of the busbars shown in FIG. 3a;

FIG. 4b is a schematic cross-sectional view of one of the busbar assemblies shown in FIG. 4 taken along line 4B—4B of FIG. 4a;

FIG. 5b is a schematic cross-sectional view of the busbars shown in FIG. 5 and taken along line 5B—5B of FIG. 5a;

DETAILED DESCRIPTION OF THE PREFERRED EMBODIMENTS

Figure 1:
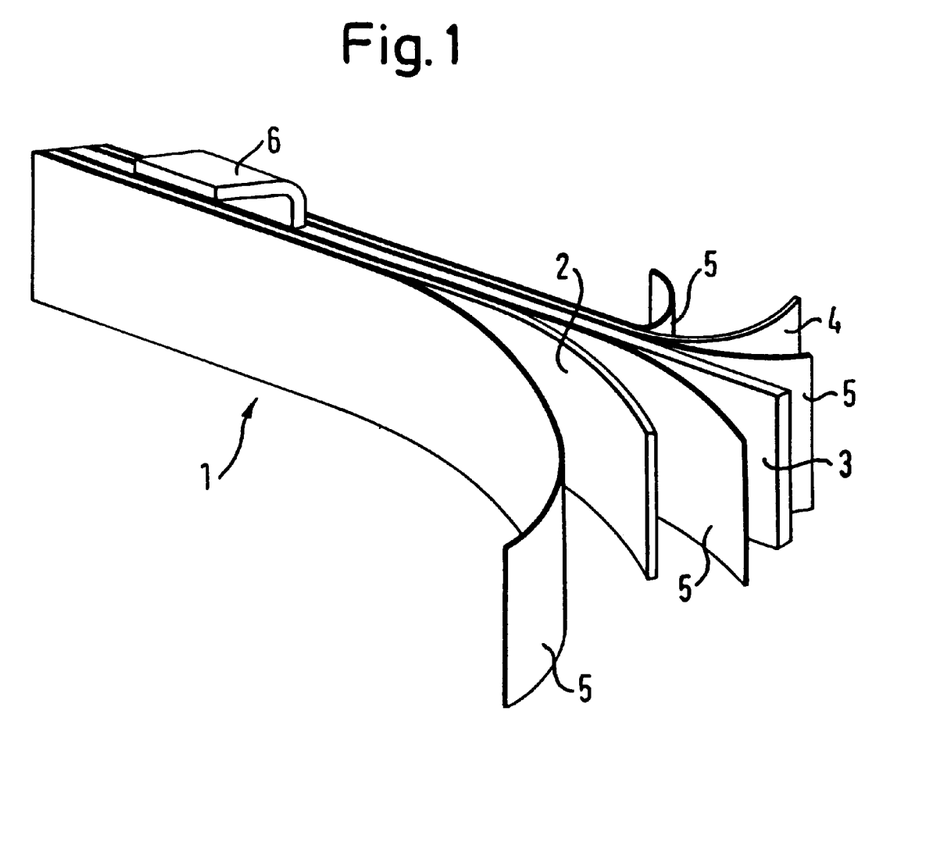
FIG. 1 is a diagram showing the structure of a busbar cabling arrangement in accordance with the invention.

FIG. 1 shows, in a manner which is not exhaustive, the principle whereby a busbar 1 is used in the present invention, it being borne in mind that all shapes and dimensions are possible. In order to aid improved comprehension of the device in accordance with the invention, the right-hand termination of the busbar in FIG. 1 shows the conductors detached and separated, conductors 2, 3 and 4 each being isolated from the others by the dielectric sheet material 5 offering a high level of electrical insulation. The external conductive layers 2 and 4 are covered in the same manner on their external surface by sheet material 5. Electrical conductors 2, 3 and 4 have different conductive cross-sections due to the different intensities of current they are called upon to carry. On the left-hand termination of the busbar shown in FIG. 1, a branch connection 6, that is to say a conductive tongue, is shown, which is in electrical contact with the conductors 2, 3 and 4, through which electrical connection with another busbar or an electrical component is possible. It is possible to provide in this manner several branch connections for each conductor or to group such connections together within a single connector housing.

Figure 2A:
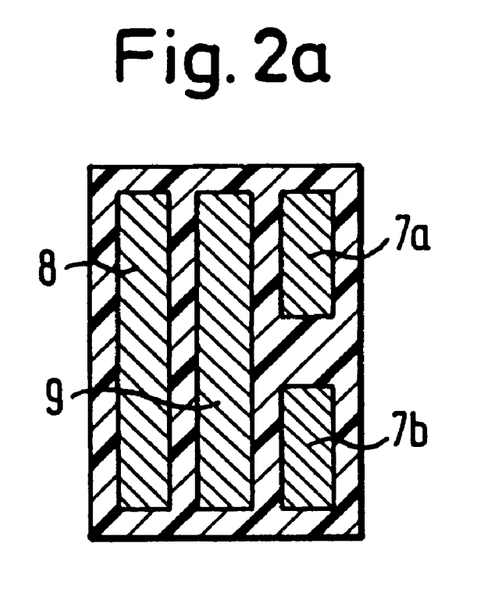
FIGS. 2 and 2b show two different arrangements of the lines carrying power and control currents.

FIG. 2 shows two different arrangements of conductors carrying power and conductors carrying control signals. FIG. 2a shows two control conductors 7a and 7b and two power conductors 8 and 9, the control conductors 7a and 7b being placed to one side of the supply current lines and stacked one above the other and separated one from another by insulating sheet material.

Figure 2B:
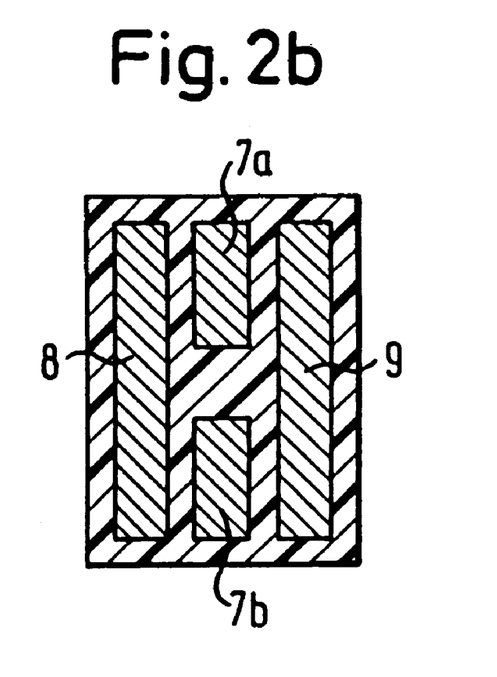

In one variant, the control conductors 7a and 7b are placed, in accordance with the arrangement shown in FIG. 2b, between the two power conductors 8 and 9. This arrangement is advantageous in that the control conductors are in this way placed within what amounts to a condenser formed by conductors 8 and 9, where they are protected from EMI/RFI. In the case of the arrangement shown in FIG. 2a, an outer shielding is necessary. According to one variant, the data transmission and power currents are overlaid and transmitted along the same conductors.

Figure 3A:
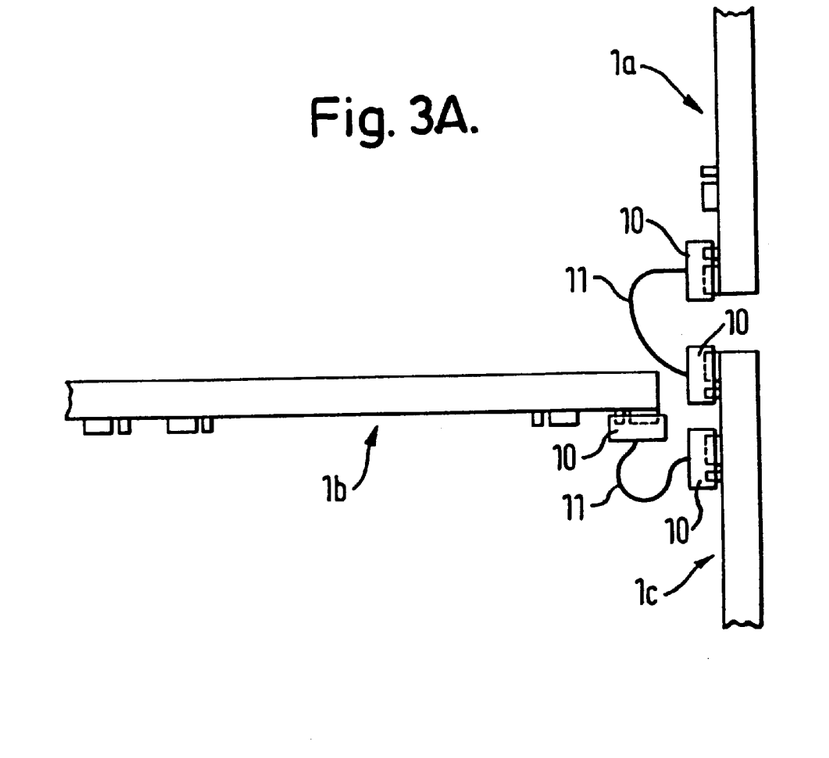
FIG. 3a is a diagram showing one manner in which the busbar may be connected.
Figure 3B:
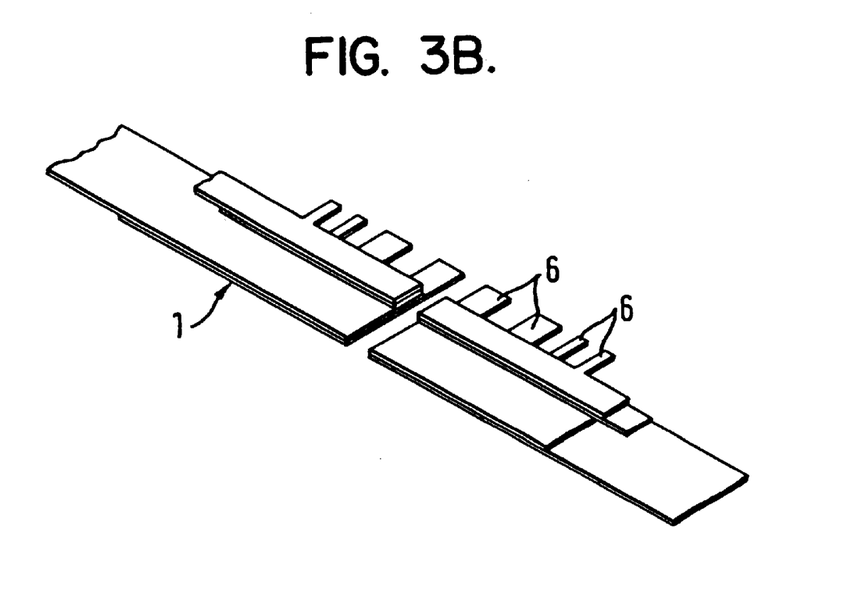
Figure 4:
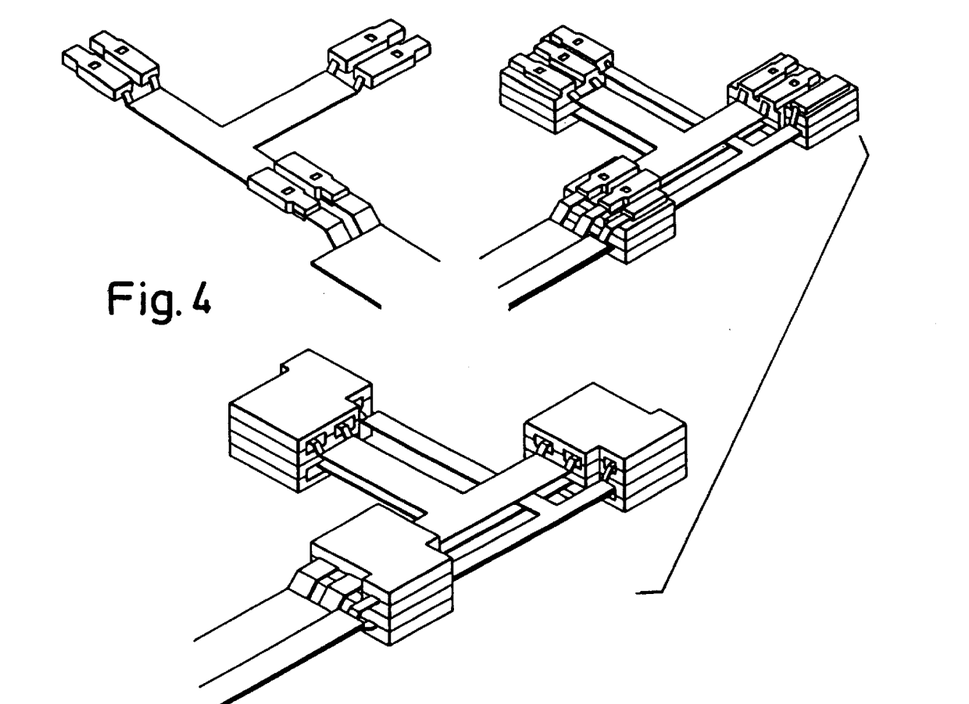
FIG. 4 is a diagram showing a second method of connecting busbar.
Figure 4A:
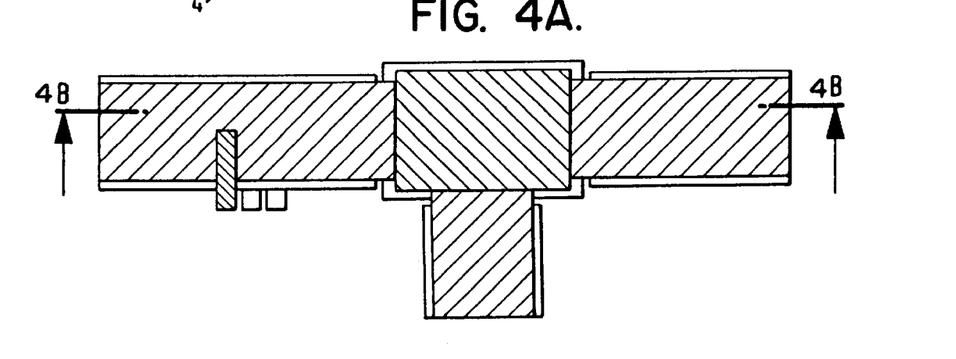
FIG. 4a is a schematic cross-sectional view of one of the busbar assemblies shown in FIG. 4 taken along line 4A—4A of FIG. 4b.
Figure 4B:
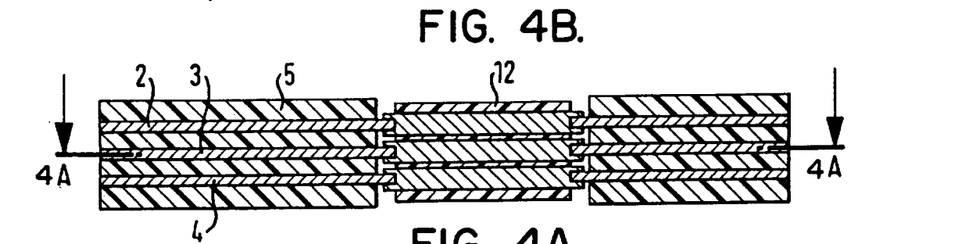
Figure 5:
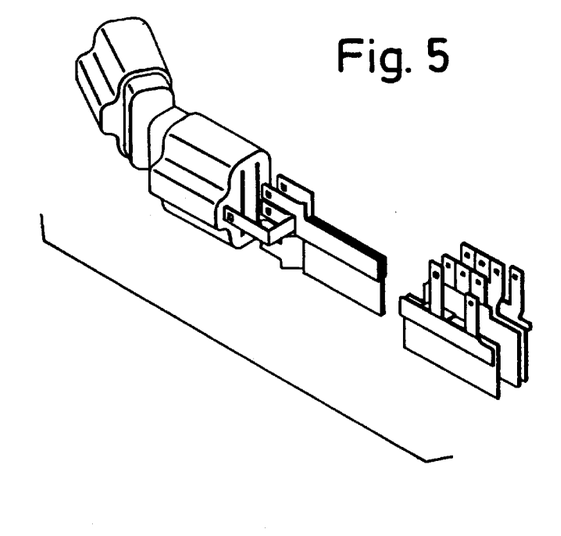
FIG. 5 is a diagram showing a third method of connecting busbar.
Figure 5A:
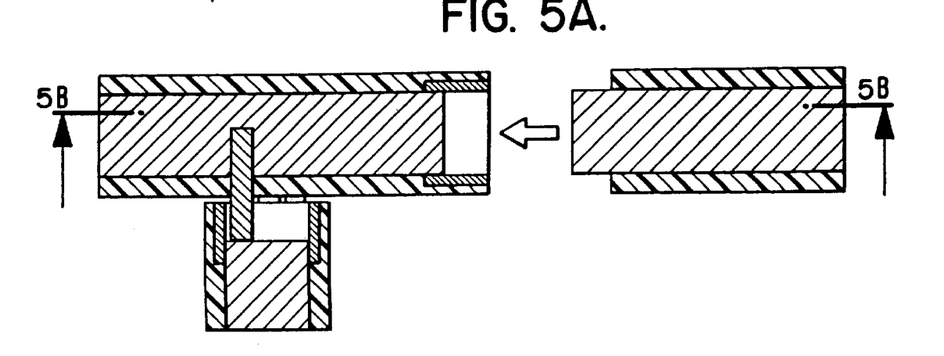
FIG. 5a is a schematic cross-sectional view of the busbars shown in FIG. 5 and taken along line 5A—5A of FIG. 5b.
Figure 5B:
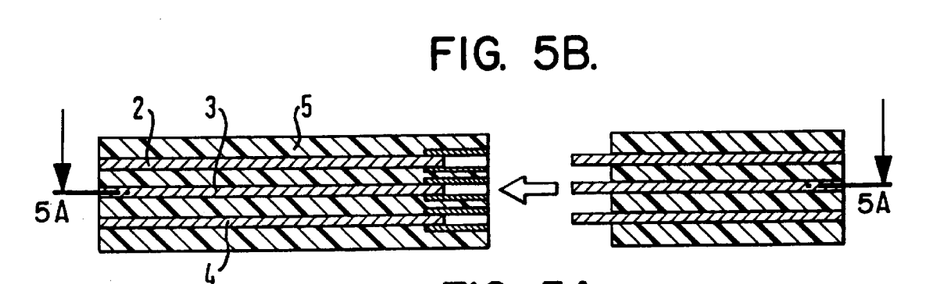

In FIGS. 3, 4 and 5, three different forms of connection between two busbar or between a busbar and an electrical or electronic component are made explicit. FIG. 3 shows three busbar 1a, 1b and 1c, of which a detailed perspective view is provided underneath. Each of the busbar has connection tongues 6, of which the widest should preferably be connected to power conductors and the narrowest to control conductors. Connectors 10 are fitted to tongue arrangements. Connectors 10 connect the tongues 6 to a current takeoff wire, which is connected to another connector 10, which is mounted on another tongue arrangement 6 on another busbar. In this way, two busbar can be connected one to the other by means of the wires 11, in such a manner that the busbar may be disposed in any desired manner in relation to each other.

The top part of FIG. 4 provides a perspective view of a second method of interconnecting busbar. It can be seen in the figure that a number of conductive strips, narrower than the width of the busbar, leave the end terminations of the busbar and lead to connectors 12, to which they are attached. These connectors are arranged in housings manufactured in an electrically insulating material and which may be stacked in such a manner that different conductors in a busbar, separated one from another by insulating sheet material, may be connected to the connector. On the opposite face of the connector housing, conductive strips from the end termination of another busbar may also be fitted, or, as can be seen at the top of FIG. 4, branch connections may be provided. All include connectors which may be placed in stacked housings. Such connector arrangements are shown in the bottom half of FIG. 4 in plan and sectional views.

FIG. 5 shows a third method of interconnecting two busbar, in which laminated conductive strips leaving the end termination of a busbar may be used as contact blades and mounted in a connector housing, which may be plugged into a female socket connector unit on a conductor from a second busbar. The bottom half of FIG. 5 shows such an arrangement in sectional and plan views.

Figure 6A:
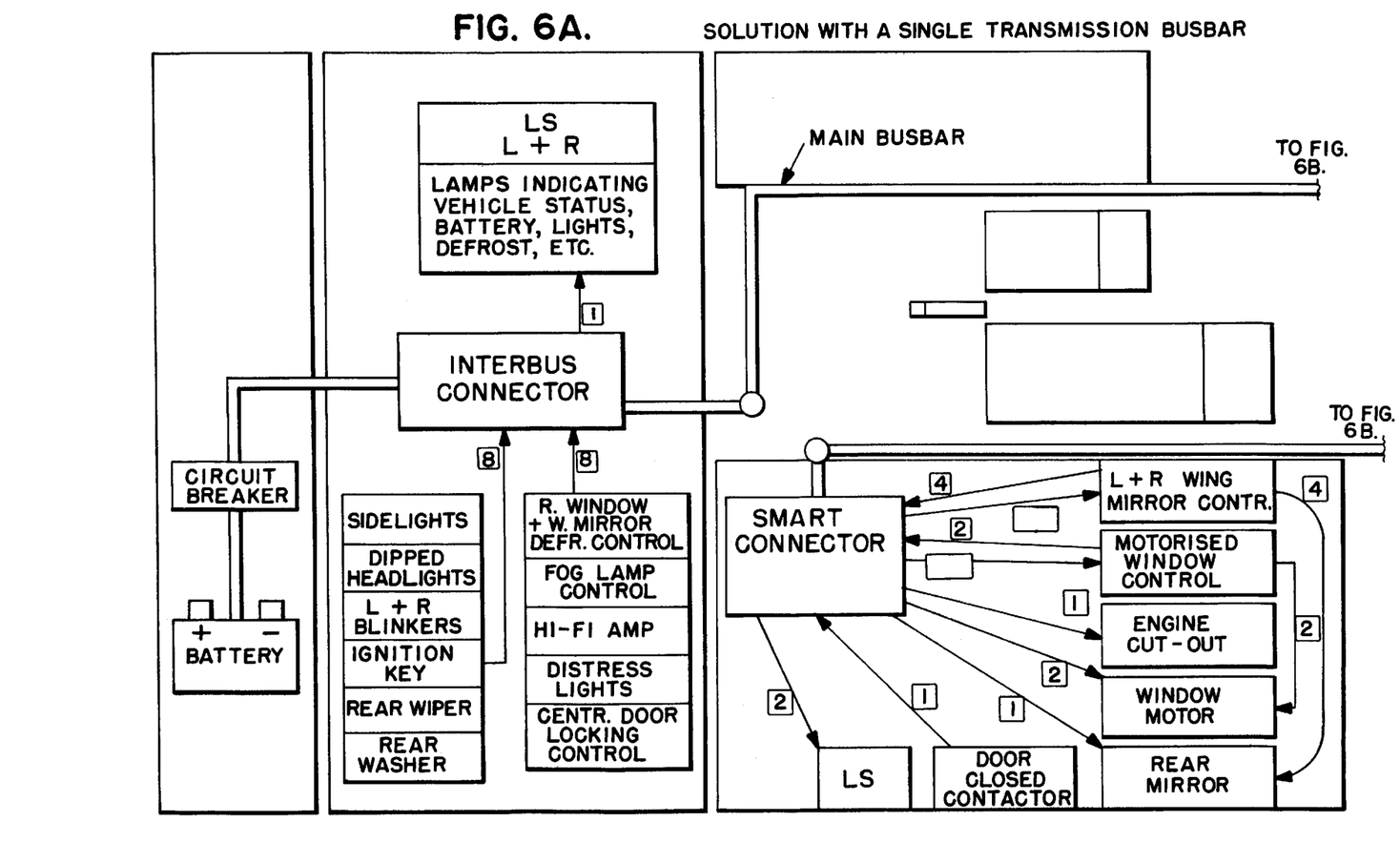
FIGS. 6A and 6B provide an example of a wiring arrangement involving use of a busbar in accordance with the the invention.
Figure 6B:
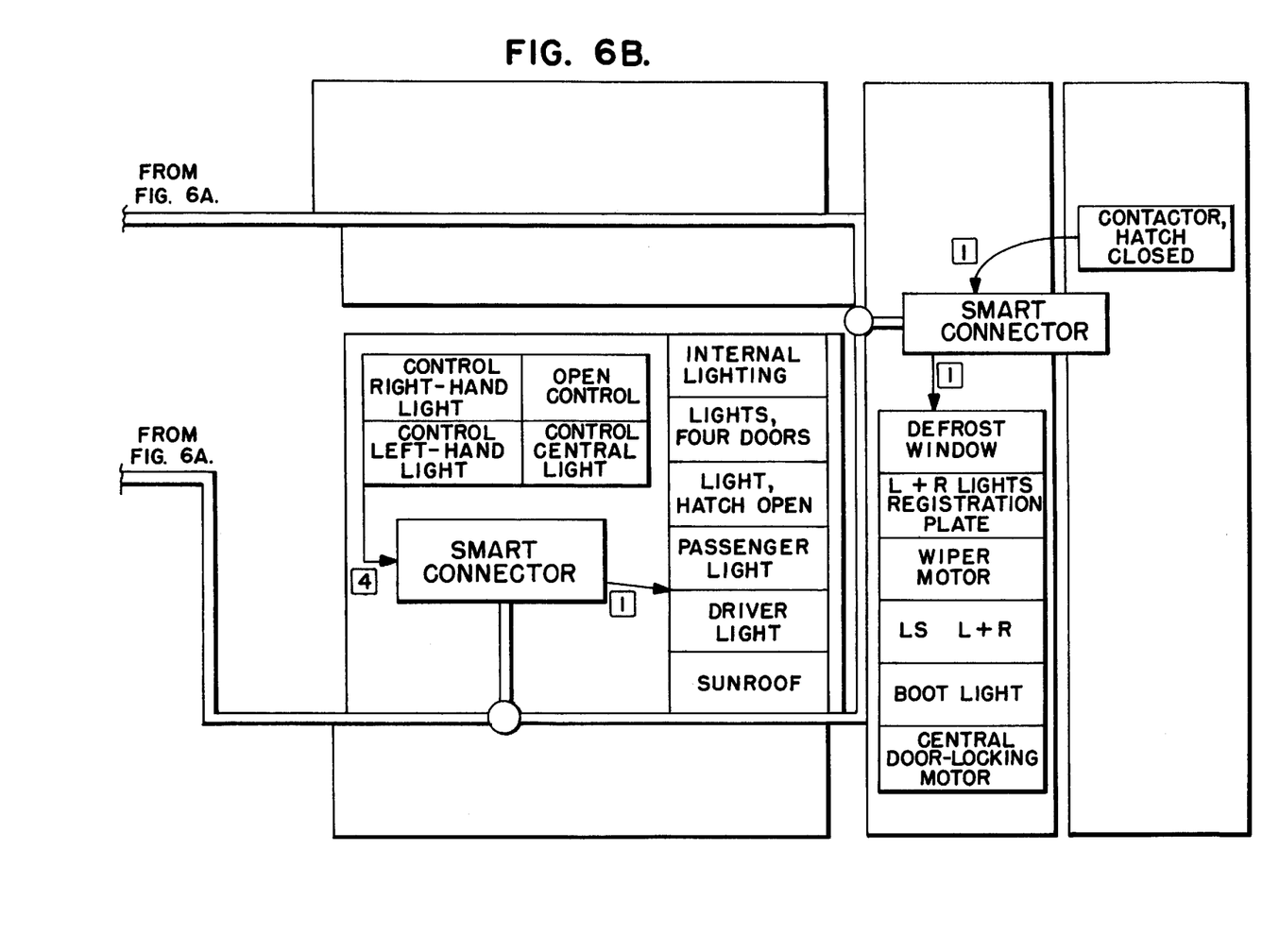

FIGS. 6A and 6B show, in diagrammatic form, a cabling arrangement with a busbar in which different connectors are connected and which possesses a multiplexing capability. In such connectors, CAN (Controller Area Network) multiplexing components are provided which may selectively transmit signals intended for specific components or send along the loop circuit signals deriving from sensors. The CAN components may then permit, when they are included in a connector, the implementation and use of so-called "smart" connectors allowing the CAN components to command and monitor the functions to be controlled.

What is claimed is:

1. A system for transmitting power and signals in a motorized vehicle, the system comprising:

an electrical power supply;
a plurality of different types of electrical components having multiplexing circuitry; and
a first busbar electrically connected to the power supply and the electrical components, the busbar comprising at least two power conductors connected to the power supply and at least two signal conductors, the conductors comprising respective elongate strips of conductive material separated from each other by dielectric material and assembled into a layered structure,
wherein the plurality of the electrical components are all connected to the signal conductors, wherein respective multiplexed control signals transmitted on the signal conductors can be received and used by specific ones of the electrical components, and wherein the plurality of electrical components are connected to the power supply by the power conductors.

2. A system as in claim 1 wherein the dielectric material includes sheets of insulating material located between the conductors.

3. A system as in claim 1 wherein the multiplexing circuitry is in respective connectors connecting the busbar to the electrical components.

4. a system as in claim 1 further comprising sensors connected to the signal conductors of the busbar.

5. A system as in claim 1 wherein the busbar is shaped along its length to conform to a shape of a portion of a vehicle chassis.

6. A system as in claim 1 further comprising means for overlaying analogue or digital control currents with electrical power supply currents on the busbar.

7. A system as in claim 1 further comprising means for overlaying the power and signal transmissions on the same conductors.

8. A system as in claim 1 wherein at least one of the signal conductors is located between the at least two power conductors.

9. A system as in claim 8 wherein the at least two signal conductors are located between the at least two power conductors.

10. A system as in claim 9 wherein the power conductors comprise a rectangular cross-section.

11. A system as in claim 10 where the signal conductors comprise a rectangular cross-section.

12. A system as in claim 1 further comprising a second busbar having power conductors and signal conductors connected to the first busbar.

13. A system as in claim 12 wherein the first and second busbars are connected to each other by flexible wiring.

14. A system as in claim 12 wherein the first and second busbars are connected to each other by metal strips narrower than widths of the busbars and a coupling component.

15. A system as in claim 12 wherein the first and second busbars comprising mating plug and socket sections.

16. A method of distributing electrical power and control signals to different types of vehicle electrical components comprising steps of:

providing the electrical components with multiplexing circuitry for demultiplexing respective addressed multiplexed control signals;
connecting a busbar to the electrical components, the busbar comprising at least two power conductors and at least two signal conductors, the power conductors comprising respective elongate strips of conductive material, the conductors being separated from each other by dielectric material and assembled into a layered structure;

connecting the power conductors of the busbar to a power supply; and transmitting multiplexed control signals on the signal conductors.

17. A method as in claim 16 wherein the step of providing the electrical components with multiplexing circuitry comprises providing connectors between the electrical components and the busbar, the connectors comprising the demultiplexing circuitry.

18. A method as in claim 16 further comprising permanently deforming the busbar into a shape along its length to conform to a shape of a portion of a vehicle chassis.

19. A method as in claim 16 further comprising transmitting overlaid analogue or digital control currents with electrical power supply currents on a same one of the conductors of the busbar.

* * * * *